United States Patent [19]

Yokota

[11] Patent Number: 4,699,521
[45] Date of Patent: Oct. 13, 1987

[54] SANDWICH TYPE ATTACHMENT MOUNTING STRUCTURE OF A ROLLING CONTACT BEARING ASSEMBLY

[75] Inventor: Yasunori Yokota, Ebina, Japan

[73] Assignee: Nippon Thompson Company, Ltd., Japan

[21] Appl. No.: 5,315

[22] Filed: Jan. 16, 1987

Related U.S. Application Data

[63] Continuation of Ser. No. 778,595, Sep. 20, 1985, abandoned.

[30] Foreign Application Priority Data

Sep. 20, 1984 [JP] Japan ............................... 59-195701

[51] Int. Cl.$^4$ ..................... F16C 43/04; A47B 88/00
[52] U.S. Cl. .................................... 384/18; 384/22; 384/59
[58] Field of Search ..................... 384/17–19, 384/22, 23, 34, 40–42, 49, 59; 411/546, 427, 366–368

[56] References Cited

U.S. PATENT DOCUMENTS

| | | | |
|---|---|---|---|
| 856,246 | 6/1907 | Gamon | 411/84 |
| 1,735,926 | 11/1929 | Jandus | 411/366 |
| 1,835,710 | 12/1931 | Jenkins et al. | 411/84 |
| 1,915,630 | 6/1933 | Tichenor | 411/427 X |
| 2,329,158 | 9/1943 | Gill | 411/427 X |
| 2,525,217 | 10/1950 | Glitsch | 411/368 X |
| 2,670,028 | 2/1954 | Doty et al. | 308/3.8 |
| 2,733,972 | 2/1956 | Diack | 308/3.6 |
| 3,143,758 | 8/1964 | Dunham | 308/3.8 |
| 3,649,086 | 3/1972 | Vance | 308/3.8 X |
| 4,348,063 | 9/1982 | Chambers | 308/3.8 |

FOREIGN PATENT DOCUMENTS

| | | | |
|---|---|---|---|
| 134727 | 10/1949 | Australia | 411/366 |
| 559248 | 2/1944 | United Kingdom | 411/427 |

Primary Examiner—Stuart S. Levy
Assistant Examiner—Thomas R. Hannon
Attorney, Agent, or Firm—Thomas S. MacDonald; Alan H. MacPherson; Paul J. Winters

[57] ABSTRACT

A structure for mounting an attachment member to a linear motion rolling contact bearing assembly including a bed, a table and a plurality of rolling members interposed between the bed and the table thereby providing a relative motion between the table and the bed. The mounting structure includes an alignment hole defined in the bed or table, a mounting hole defined in the attachment member, a counter member provided with a threaded hole and a bolt extending through the aligned mounting and alignment holes to be threaded into the threaded hole of the counter member with its head in engagement with the attachment member. In the preferred embodiment, the counter member has a contact surface which is substantially the same as and located opposite to a contact surface of the attachment member. In another form, the counter member may be located as sandwiched between the attachment member and the table or bed, in which case the bolt extends through the holes of the table or bed and the counter member to be threaded into the threaded hole of the attachment member.

6 Claims, 24 Drawing Figures

○ PRIOR ART

| PRESENT INVENTION

SANDWICH TYPE ATTACHMENT MOUNTING STRUCTURE OF A ROLLING CONTACT BEARING ASSEMBLY

This application is a continuation of application Ser. No. 778,595, filed Sept. 20, 1985, now abandoned.

BACKGROUND OF THE INVENTION

1. Field of the Invention

This invention relates generally to a rolling contact bearing assembly, and, in particular, to a structure for mounting an attachment to such a rolling contact bearing assembly. More specifically, the present invention relates to a structure for mounting a fixture member, such as an attachment, to a body of a linear motion rolling contact bearing assembly including a bed and a table which are both structured to have a U-shaped cross section from a thin steel plate and which are assembled with rolling members interposed therebetween thereby allowing motion relative to each other.

2. Description of the Prior Art

A linear motion rolling contact bearing assembly is well known in the art, and it generally comprises a bed (or rail), a table (or slider) and a plurality of rolling members interposed between the bed and the table to be in rolling contact with opposed guide grooves formed in the bed and the table. Thus, a relative motion is provided between the bed and the table through the rolling members, so that the table can move along the bed slidingly in a reciprocating manner. The bed is generally constructed in the form of a straight rail having a U-shaped cross section from a thin steel plate, and, similarly, the table is also constructed to have a U-shaped cross section from a thin steel plate so that the table straddles the bed when assembled. Since a relative linear motion is provided between the bed and the table with a minimum of resistive force mainly due to friction, this linear motion rolling contact bearing assembly finds many applications in various fields, such as machine tools and robots in manufacturing or assembly lines for various products.

Figure 6:
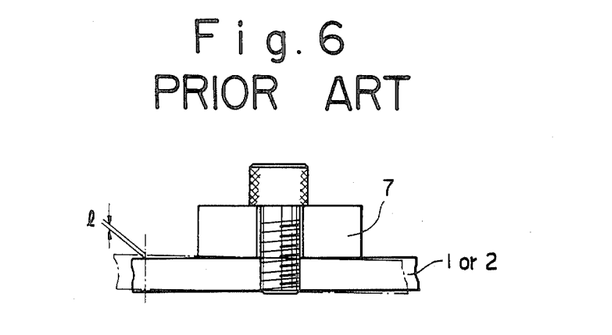
FIG. 6 is a schematic illustration showing a typical structure for mounting an attachment member to a linear motion rolling contact bearing assembly.

When such a linear motion rolling contact bearing assembly is used in various fields of application, a fixture member or attachment must be mounted on the bearing assembly to transmit the relative motion to other components. For this purpose, either one or both of the bed and the table is typically provided with a hole, threaded or unthreaded, and the attachment is fixedly mounted on the bearing assembly by means of a bolt. FIG. 6 shows one prior art example in which an attachment member 7 is fixedly attached to a table 1 or bed 2 of such a linear motion rolling contact bearing assembly by means of a bolt. In this case, the attachment member 7 is provided with a through-hole and the table 1 or bed 2 is provided with a threaded hole and a bolt is screwed into the threaded hole provided in the table 1 or bed 2 to have the attachment member 7 fixedly attached to the table 1 or bed 2. With this structure, however, since the table 1 or bed 2 is comprised of a relatively thin steel plate, it becomes deformed when the bolt is tightened as indicated by the solid line after tightening and the one-dotted line before tightening. In this case, the table 1 or bed 2 becomes somewhat warped after tightening so that an error in position indicated by l occurs at a certain point after tightening.

Figure 10:
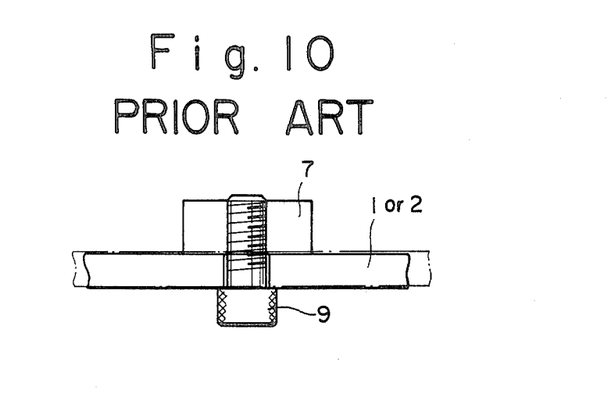
FIG. 10 is a schematic illustration showing another typical structure for mounting an attachment member to a linear motion rolling contact bearing assembly.

FIG. 10 shows another typical prior art structure for affixing the attachment member 7 to the table 1 or bed 2 of the linear motion rolling contact bearing assembly, and, in this case, which is a reverse of the case shown in FIG. 6, the attachment member 7 is provided with a threaded hole and the table 1 or bed 2 is provided with a through-hole, wherein a bolt 9 is screwed into the threaded hole of the attachment member 7 for having the attachment member 7 fixedly attached to the table 1 or bed 2. Also in this case, the table 1 or bed 2 is deformed after tightening the bolt 7. If the table 1 or bed 2 is deformed due to tightening of the bolt 9 for fixed mounting of the attachment member 7, the opposed guide grooves formed on the opposed surfaces of the table 1 and the bed 2 are misaligned, which then would increase the resistive force against the relative motion between the table 1 and the bed 2. Thus, such a deformation of the table 1 or bed 2 is disadvantageous because a smooth relative motion between the table 1 and the bed 2 is impaired.

SUMMARY OF THE INVENTION

In accordance with the present invention, there is provided a structure of mounting an attachment member on any desired part of a linear motion rolling contact bearing assembly without producing any deformation even if use is made of a bolt. The linear motion rolling contact bearing assembly embodying the present invention includes a straight bed comprised of a thin steel plate formed by bending to have a U-shaped cross section and provided with a pair of guide grooves on opposite side surfaces thereof, a table also comprised of a thin steel plate formed by bending to have a U-shaped cross section and provided with a pair of guide grooves on opposite side surfaces thereof, each opposite to the corresponding one of the guide grooves of the bed, and a plurality of rolling members interposed between the opposed pairs of guide grooves of the table and the bed. In one form, the table having a U-shaped cross section is provided to straddle the bed also having a U-shaped cross section in a U-shaped cross section opposed relation.

In accordance with the principle of the present invention, a mounting hole, threaded or unthreaded, is formed in the table or bed of the linear motion rolling contact bearing assembly, and when an attachment member is fixedly mounted on the table or bed by means of a bolt as fitted into the mounting hole, a counter member is provided at the side of the table or bed opposite to the side where a head of the bolt is located. That is, in accordance with one form of the present invention, a linear motion rolling contact bearing assembly includes a bed, a table and a plurality of rolling members interposed between the bed and the table for providing a relative motion between the bed and the table, wherein a structure for mounting an attachment member having a mounting hole to one side surface of the bed or table includes an alignment hole provided in the bed or table, a counter member provided with a threaded hole located at the opposite side surface of the bed or table with respect to the attachment member and a bolt tightly threaded into the threaded hole of the counter member as extending through the mounting and alignment holes. In the preferred mode of the invention, the counter member has a contact surface which is brought into contact with the table or bed and which is substantially the same in area and opposite to the contact surface of the attachment member.

In accordance with another form of the present invention, a structure for mounting an attachment member to the bed or table is constructed such that a threaded mounting hole is provided in the attachment member and an alignment hole is provided in the table or bed wherein a bolt is tightened as threaded into the threaded mounting hole of the attachment member extending through the alignment hole with the counter member sandwiched between the table or bed and the attachment member. In the preferred embodiment, the counter member sandwiched between the table or bed and the attachment member includes a washer, and, most preferably, the washer has an outer diameter which is substantially equal to the outer diameter of the head of the bolt.

In accordance with a still further form of the present invention, in the case where a plurality of alignment holes are provided in the table or bed for mounting two or more attachment members, a single piece counter member having a plurality of mounting holes corresponding in position to the alignment holes is provided.

It is therefore a primary object of the present invention to overcome the disadvantages of the prior art as described before and to provide an improved linear motion rolling contact bearing assembly.

Another object of the present invention is to provide an improved structure for mounting an attachment member to a linear motion rolling contact bearing assembly, which can insure smooth operation.

A further object of the present invention is to provide an improved structure for mounting an attachment member to a liner motion rolling contact bearing assembly, which is high in accuracy and tolerance but easy and thus inexpensive to manufacture.

A still further object of the present invention is to provide an improved structure for mounting an attachment member to a linear motion rolling contact bearing assembly, which is relatively sturdy in structure even if use is made of a thin steel plate for forming components of the assembly, such as a bed and a table.

Other objects, advantages and novel features of the present invention will become apparent from the following detailed description of the invention when considered in conjunction with the accompanying drawings.

DESCRIPTION OF THE PREFERRED EMBODIMENTS

Figure 1:
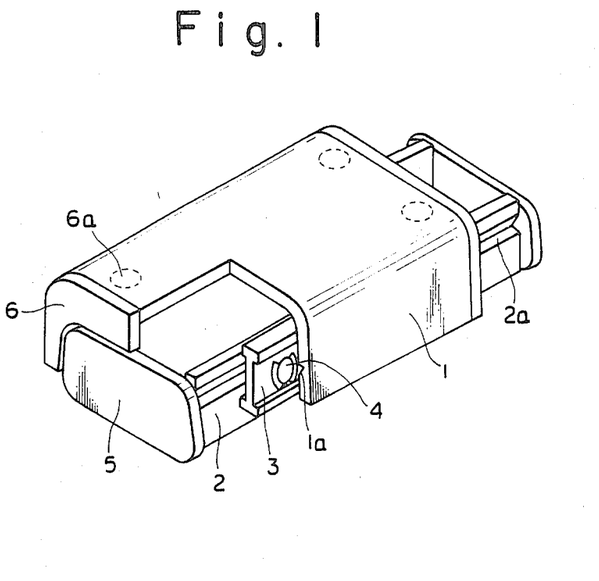
FIG. 1 is a partially cut-away, schematic, perspective view showing a linear motion rolling contact bearing assembly to which the present invention may be advantageously applied.
Figure 2:
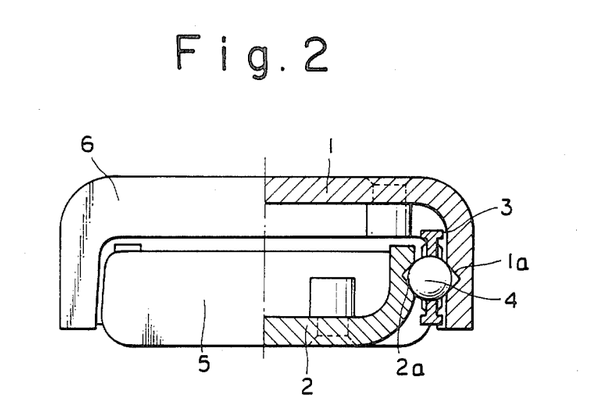
FIG. 2 is a schematic illustration, half in end view and half in cross-sectional view, showing the linear motion rolling contact bearing assembly of FIG. 1.

Referring now to FIGS. 1 and 2, there is shown a linear motion rolling contact bearing assembly to which the present invention of mounting an attachment member is advantageously applied. As shown, the linear motion rolling contact bearing assembly includes a table 1 which is preferably comprised of a thin steel plate as bent to have a U-shaped cross section in the transverse direction. Thus, the table 1 includes a flat base section and a pair of side wall sections extending upward from opposite sides of the base section. Each of the side wall sections of the table 1 is formed at its inner surface with a guide groove 1a, which is generally V-shaped in cross section and extends in parallel with the longitudinal direction of the table 1. The linear motion rolling contact bearing assembly also includes a bed 2 which is also preferably constructed from a thin steel plate bent to have a U-shaped cross section. Thus, the bed 2 also has a flat base section and a pair of side wall sections, each of which is provided with a guide groove 2a in opposed relation to the corresponding guide groove 1a of the table 1, thereby defining an elongated guide passage. In the illustrated embodiment, the width of the bed 2 is designed to be smaller by a predetermined amount than the width of the table 1, so that the table 1 straddles the bed 2 when assembled as shown.

Figure 3A:
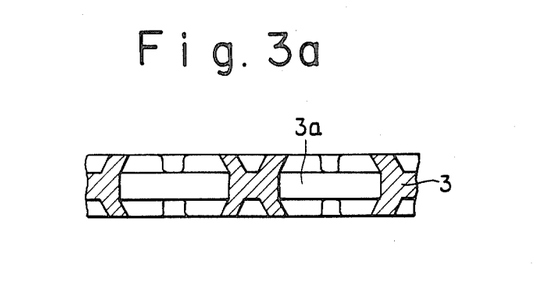
FIGS. 3a and 3b are schematic illustrations showing the ball retainer employed in the linear motion rolling contact bearing assembly shown in FIGS. 1 and 2.
Figure 3B:
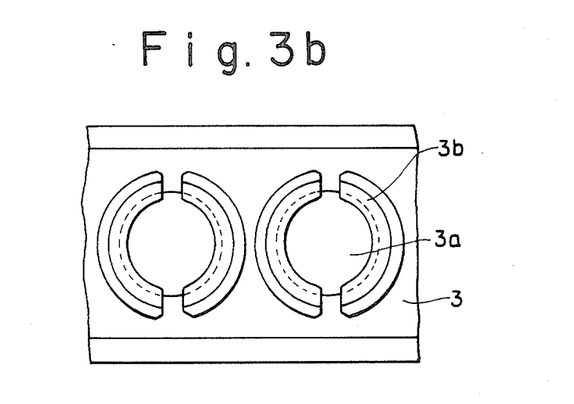

In each of the guide passages defined between the opposed surfaces of the side wall sections of the table 1 and the bed 2, a ball retainer 3 is disposed for retaining a plurality of balls 4 in position. Thus, the balls 4 are located in the guide passage as being in rolling contact with a pair of opposed guide grooves 1a and 2a as spaced apart from one another at a predetermined pitch. The retainer 3 has an I-shaped cross section and its detailed structure is shown in FIGS. 3a and 3b. That is, the retainer 3 is in the form of an elongated beam having an I-shaped cross section and it is provided with a plurality of ball holding holes 3a arranged along its longitudinal direction and spaced apart from one another at a predetermined pitch. Each of the ball holding holes 3a is generally circular in shape and the retainer 3 also includes a plurality of ball holding tabs 3b which are arranged along the circumference of each ball holding hole 3a such that the ball 4 may be held in position as located in the hole 3a. It is to be noted, however, that the retainer 3 is preferably comprised of an elastic material, such as plastic, such that balls 4 may be squeezed into the corresponding holes 3a by hand.

Figure 4:
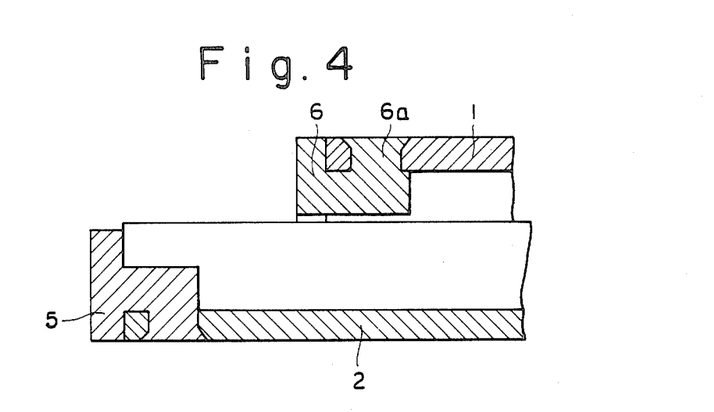
FIG. 4 is a fragmentary, longitudinal cross section showing part of the cross-sectional structure of the linear motion rolling contact bearing assembly shown in FIGS. 1 and 2.

The table 1 is also provided with an upper end member 6, which is also generally U-shaped, at each end. The upper end member 6 is preferably comprised of a plastic material and it is integrally formed with the table as best shown in FIG. 4. That is, a part 6a of the upper end member 6 is anchored into a hole formed in the table 1. Similarly, the bed 2 is also provided with a bottom end member 5 at each end thereof, and the bottom end member 5 is generally rectangular thereby closing the end of the bed 2 substantially. It is to be noted that the bottom end member 5 is preferably comprised of a plastic material as partly anchored into a hole formed in the bed in a manner similar to the upper end member 6, as shown in FIG. 4. Importantly, there is formed a gap between the upper and lower end plates 6 and 5 so that there is a chance that the retainer 3 may come out of the assembly by passing through the gap; however, in accordance with the structure shown here, since the retainer 3 has an I-shaped cross section, the top and bottom portions of the retainer 3 come into engagement with either one or both of the upper and lower end members 6 and 5 properly so that there is no danger for the retainer 3 to come out of the assembly undesirably.

Figure 5A:
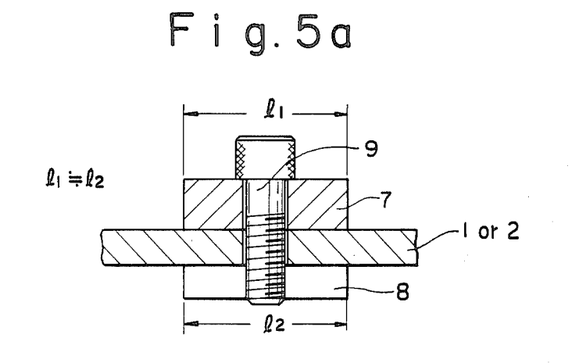
FIGS. 5a and 5b are schematic illustrations showing examples of mounting an attachment member to the linear motion rolling contact bearing assembly in accordance with one embodiment of the present invention.
Figure 5B:
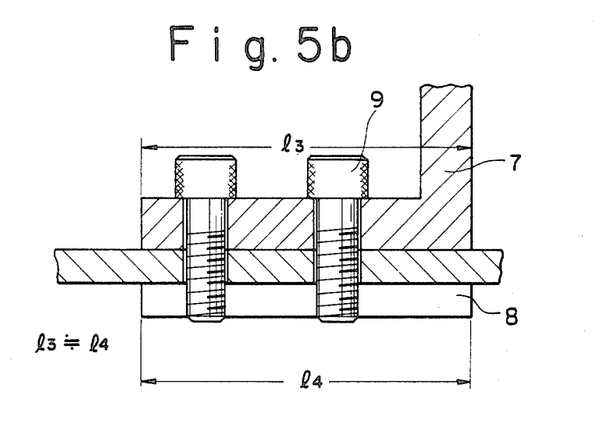

Referring now to FIGS. 5a and 5b, there is shown schematically a structure in which an attachment member 7 is fixedly mounted on either one of the table 1 or bed 2 by means of a bolt or bolts 9. FIG. 5a shows the case in which the attachment member 7 is fixedly attached to the table 1 or bed 2 by means of a single bolt 9 and FIG. 5b shows the case in which the attachment member 7 is fixedly attached to the table 1 or bed 2 using two bolts 9. In either of FIGS. 5a or 5b, the attachment member 7 is provided with at least one mounting hole and the table 1 or bed 2 is provided with at least one threaded alignment hole, and, when the attachment member 7 is placed in position in contact with one surface of the table 1 or bed 2, its mounting hole comes aligned with the corresponding threaded alignment hole of the table 1 or bed 2. In accordance with the principle of the present invention, a counter member 8 is provided at the surface of the table 1 or bed 2 opposite to the surface where the attachment member 7 is to be fixedly attached and the counter member 8 is provided with a threaded hole into which the bolt 9 is tightly threaded as extending through the mounting and alignment holes provided in the attachment member 7 and the table 1 or bed 2, respectively. Preferably, the counter member 8 is so structured that it has a contact surface, coming into contact with the table 1 or bed 2 when assembled, which is equal to or substantially equal to the contact surface of the attachment member 7 and the contact surface of the counter member 8 is located substantially opposite to the contact surface of the attachment member 7.

Figure 7A:
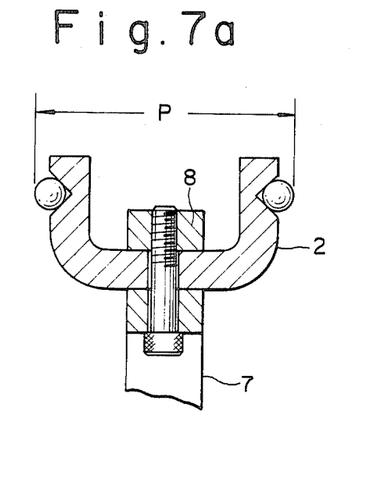
FIGS. 7a and 7b are schematic illustrations showing how measurements were taken for evaluating the level of error caused by mounting an attachment to the bed of a linear motion rolling contact bearing assembly.
Figure 7B:
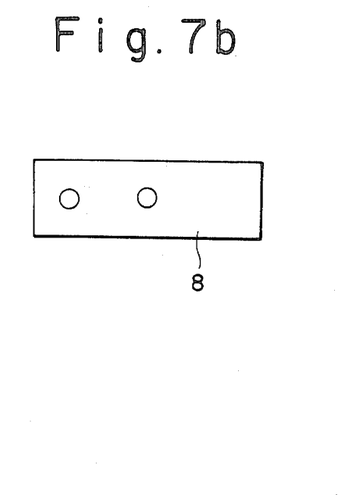
Figure 8:
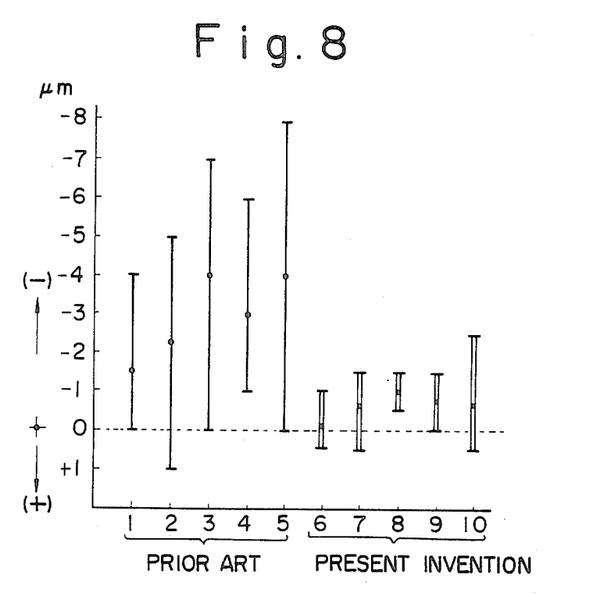
FIG. 8 is a graph showing the results obtained with the structure shown in FIGS. 7a and 7b.

FIG. 7a illustrates the structure for measuring errors produced in a distance P between the outer ends of the balls 4 fitted in the opposite guide grooves of the bed 2 when the attachment member 7 is fixedly attached to the bed 2 with and without the counter member 8 shown in FIG. 7b. The measured results are indicated graphically in FIG. 8, and, as shown, it is obvious that the provision of the counter member 8 having substantially the same area as and being opposite to the attachment member 7 reduces the errors significantly.

Figure 9A:
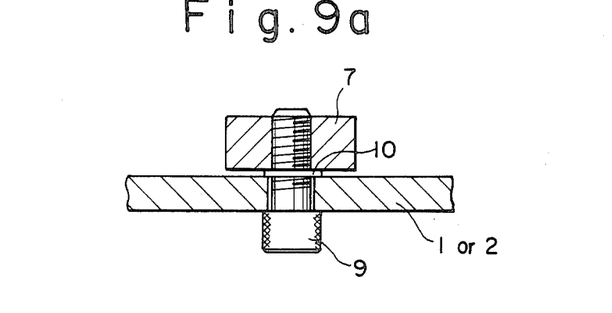
FIGS. 9a and 9b are schematic illustrations showing examples of mounting an attachment member to the linear motion rolling contact bearing assembly in accordance with another embodiment of the present invention.
Figure 9B:
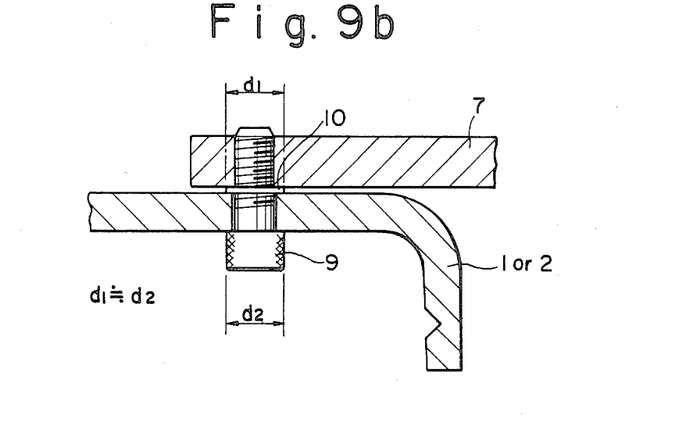

FIGS. 9a and 9b show another form of the present invention for fixedly mounting the attachment member 7 to the table 1 or bed 2. In this case, as shown in FIG. 9a, the table 1 or bed 2 is provided with an alignment hole and the attachment member 7 is provided with a threaded mounting hole which comes to be located in alignment with the alignment hole of the table 1 or bed 2 when the attachment member 7 is set in position. The bolt 9 extends through the alignment hole of the table 1 or bed 2 from the bottom and is threaded into the threaded mounting hole of the attachment member 7. It is to be noted, however, that the attachment member 7 is not in direct contact with the table 1 or bed 2 to which it is to be fixedly mounted, and, instead, the counter member 10, or a washer in the illustrated example, is provided as interposed between the attachment member 7 and the table 1 or bed 2. In the preferred embodiment as illustrated, the counter member 10 in the form of a washer has an outer diameter which is equal to or substantially equal to the outer diameter of the head of the bolt 9 which comes into contact with the opposite surface of the table 1 or bed 2.

FIG. 9b shows a modified structure in which the attachment member 7 is larger; however, it is to be noted that the bolt tightening structure remains unchanged so that the attachment member 7 is still fixedly mounted on the table 1 or bed 2 by means of the bolt 9 with the counter member 10, preferably in the form of a washer, being sandwiched between the attachment member 7 and the table 1 or bed 2. With this structure, the table 1 or bed 2 is prevented from being deformed even if the attachment member 7 is fixedly mounted on the table 1 or bed 2 by means of the bolt or bolts 9, so that the table 1 or bed 2 may be advantageously formed from a thin steel plate by suitable bending.

Figure 11:
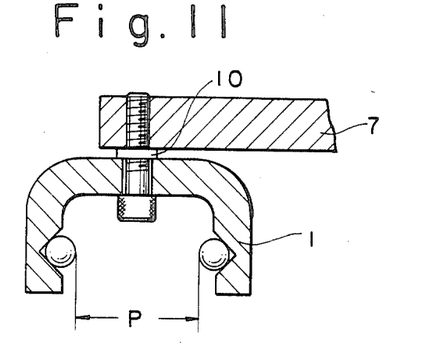
FIG. 11 is a schematic illustration showing how measurements were taken for evaluating the level of error caused by mounting an attachment to the table of a linear motion rolling contact bearing assembly.
Figure 12:
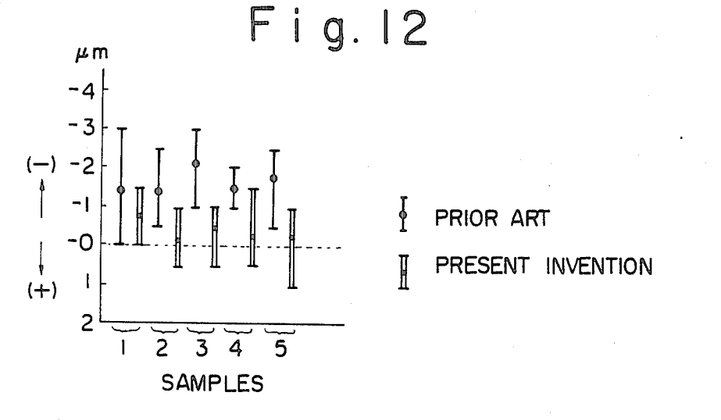
FIG. 12 is a graph showing the results obtained with the structure shown in FIG. 11.

FIG. 11 schematically shows the structure for measuring errors produced in a distance P between the inner ends of the balls 4 fitted in the guide grooves of the table 1 when the attachment member 7 is fixedly mounted on the table 1 with and without the washer type counter member 10. The measured results are shown in FIG. 12 graphically. These results also confirm the fact that the errors due to deformation are significantly reduced in accordance with the teachings of the present invention.

Figure 13A:
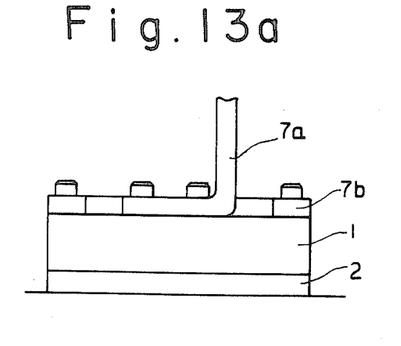
FIGS. 13a and 13b are schematic illustrations showing an example of mounting two or more attachments to a linear motion rolling contact bearing assembly.
Figure 13B:
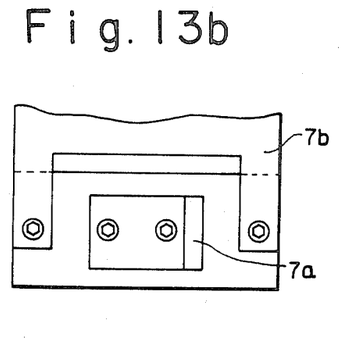

FIGS. 13a and 13b show another example in which case two different attachment members 7a and 7b are fixedly mounted on the table 1. As shown, the table 1 is provided with four alignment holes as arranged in a line as spaced apart from each other and the first attachment member 7a is fixedly mounted on the top surface of the table 1 using the inner pair of the alignment holes so tha the first attachment member 7a is provided with a pair of mounting holes which may come into alignment with the inner pair of alignment holes when the first attachment member 7a is located in position. The second attachment member 7b is somewhat larger in size and it has a pair of projections each of which is provided with a mounting hole. Thus, the mounting holes of the second attachment member 7b are aligned with the pair of outer alignment holes when so located in position.

Figure 14A:
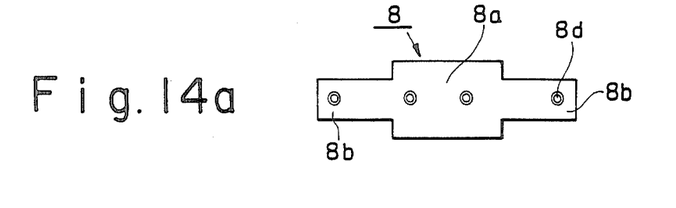
FIGS. 14a, 14b, 15a, 15b, 16a and 16b are schematic illustrations showing several examples of a counter member which may be advantageously applied to the structure shown in FIGS. 13a and 13b.
Figure 14B:
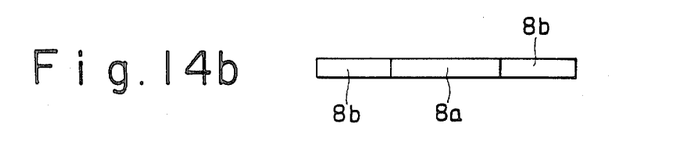

FIGS. 14a and 14b show one embodiment of the present invention which may be advantageously applied to the structure shown in FIGS. 13a and 13b. Since there are four alignment holes formed in the table 1, a counter member 8 to be used in this example is structured to be a single piece having four threaded holes 8d corresponding in position to the alignment holes in the table 1. The counter member 8 of a single piece has a central counter section 8a which is substantially the same in area as and opposite to the first attachment member 7a when it is affixed to the opposite surface of the table 1. The counter member 8 also includes a pair of end counter sections 8b and 8b on opposite sides of the central counter section 8a. Each of the end counter sections 8b and 8b extends from one side of the central counter section 8a as far as to the location where the outer alignment hole is located. The end counter section 8b is substantially opposite to the projection of the second attachment member 7b as far as an effective contact surface is concerned. That is, the end counter section 8b does not appear to be substantially the same in area as and opposite to the corresponding projection of the second attachment member 7b, but, as far as effective contact surface, which may be defined around the hole 8d, is concerned, the end counter section 8b is, in fact, substantially the same in area as and opposite to the projection of the second attachment member 7b. Such an integrated structure with the concept of effective contact surface is advantageous in various respects, e.g. in manufacture, assembly and parts management.

Figure 15A:
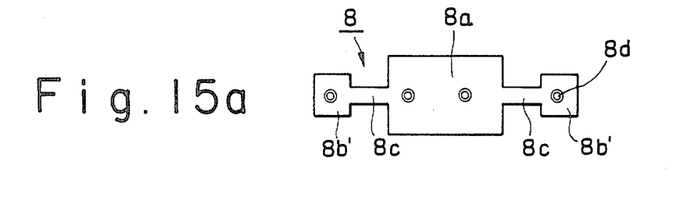
Figure 15B:
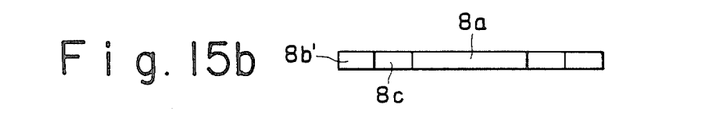
Figure 16A:
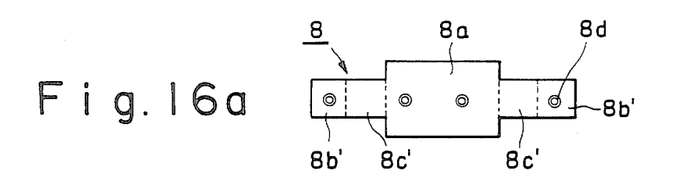
Figure 16B:
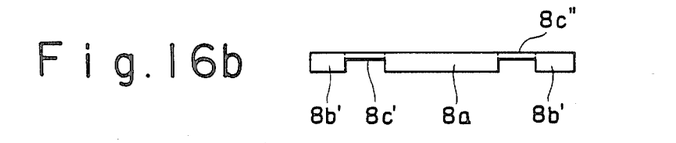

FIGS. 15a and 15b show a modification of the structure shown in FIGS. 14a and 14b. That is, this is the structure which is constructed by narrowing that portion of the end counter section 8b which is outside of the effective contact surface. Thus, the end counter section 8b of FIGS. 14a and 14b is split into two sections: an effective contact section 8b' and a narrowed section 8c. In the structure shown in FIGS. 15a and 15b, the narrowed section 8c merely serves as a connector thereby allowing to form the counter member 8 in an integrated structure. FIGS. 16a and 16b show another modification in which a thinned connector section 8c' is formed instead of the narrowed connector section 8c of the previous embodiment. The embodiments shown in FIGS. 15 and 16 are superior in terms of preventing interference between the adjacent tightening structures, but the embodiment shown in FIG. 14 is simpler in structure and thus easier to manufacture.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A structure for mounting an attachment member to a rolling contact bearing assembly including various components, such as a bed, a table, and a plurality of rolling members interposed between said bed and said table, said structure including means for preventing deformation or distortion of said bed or said table upon mounting said attachment member and to thereby ensure smooth relative motion between said bed and said table, said means comprising:

at least one alignment hole defined as extending through a selected component of said assembly;

at least one mounting hole defined as extending through said attachment member, said mounting hole coming into alignment with said alignment hole of said assembly when said attachment member is set in position at one surface of said selected component of said assembly;

a counter member provided with a threaded hole and disposed in contact with the opposite surface of said selected component; and bolt means extending through said aligned mounting and alignment holes to be threaded into said threaded hole of said counter member and having its head engaged with said attachment member.

2. The structure of claim 1 wherein said selected component is comprised of an integrally formed U-shaped thin steel plate and it is either said table or bed of said rolling contact bearing assembly, and wherein said bed is reciprocally received within said table.

3. The structure of claim 2 wherein said counter member has a first contact surface in contact with the opposite surface of said selected component which is substantially the same in area as a second contact surface of said attachment member in contact with the one surface of said selected component.

4. The structure of claim 3 wherein said first contact surface is located substantially opposite to said second contact surface.

5. In combination, a structure for mounting an attachment member to a rolling contact bearing assembly said assembly comprising a U-shaped table, a U-shaped bed reciprocally received within said table, said U-shaped table and said U-shaped bed each having a pair of side legs telescoped and spaced from each other and a flat interconnecting portion and a plurality of rolling members interposed between the legs of said bed and the legs of said table, said structure comprising:

a series of alignment holes extending through one of said interconnecting portions of said assembly;

a series of mounting holes extending through said attachment member, said mounting holes being alignable with said alignment holes of said assembly when said attachment member is set in position at a location on an interconnecting portion of said assembly;

a deformation prevention plate having a series of threaded through-holes alignable with said mounting holes and disposed between said interconnecting portions and in contact with a surface of one of said interconnecting portions; and a series of bolts extending through said aligned alignment holes, said mounting holes and said through-holes to be threaded into said threaded through-holes such that said plate prevents deformation of said bearing assembly upon mounting of said attachment member on said interconnecting portion.

6. The structure of claim 5 wherein said selected component is adapted to be integrally formed by bending a thin steel plate in a U-shape to facilitate fabrication and said component is either said table or bed of said rolling contact bearing assembly.

* * * * *